United States Patent
Schoneboom et al.

(10) Patent No.: US 9,956,865 B2
(45) Date of Patent: May 1, 2018

(54) REPLACEABLE PIN SYSTEM FOR IN-VEHICLE COMPONENT

(71) Applicant: DENSO International America, Inc., Southfield, MI (US)

(72) Inventors: Sean Paul Wade Schoneboom, Bronson, MI (US); Kevin Bockstanz, Westland, MI (US)

(73) Assignee: DENSO International America, Inc., Southfield, MI (US)

( * ) Notice: Subject to any disclaimer, the term of this patent is extended or adjusted under 35 U.S.C. 154(b) by 236 days.

(21) Appl. No.: 15/086,265

(22) Filed: Mar. 31, 2016

(65) Prior Publication Data

US 2017/0282703 A1 Oct. 5, 2017

(51) Int. Cl.
  *F01P 3/18* (2006.01)
  *B60K 11/04* (2006.01)
(52) U.S. Cl.
  CPC .................................. *B60K 11/04* (2013.01)
(58) Field of Classification Search
  CPC combination set(s) only.
  See application file for complete search history.

(56) References Cited

U.S. PATENT DOCUMENTS

| | | | | |
|---|---|---|---|---|
| 7,946,369 B2* | 5/2011 | Choi | ...... | B60K 11/04 180/68.4 |
| 8,051,933 B2* | 11/2011 | Hwang | ...... | B60K 11/04 180/68.4 |
| 8,826,538 B2* | 9/2014 | Itoh | ...... | B60K 11/04 180/68.4 |
| 2001/0001994 A1* | 5/2001 | Enomoto | ...... | B60K 11/04 180/68.4 |

* cited by examiner

*Primary Examiner* — Bryan A Evans

(57) ABSTRACT

The present disclosure provides a replaceable pin system for an in-vehicle component. The replaceable pin system including a holding member, a pin member. The pin member includes a body, a protruding portion, and a first engaging portion. The holding member includes a base, a retainer, and a second engaging portion. The retainer is spaced away from the base in the protruding direction to define a rotation space together with the base. The two ends are interposed between the retainer and the base when the body is rotated to the second orientation. The second engaging portion is formed in the holding member at a position where the first engaging portion is positioned when the body is rotated to the second orientation, whereby the first engaging portion engages with the second engaging portion when the body is at the second orientation.

16 Claims, 9 Drawing Sheets

REPLACEABLE PIN SYSTEM FOR IN-VEHICLE COMPONENT

TECHNICAL FIELD

The present disclosure relates to a replaceable pin system for an in-vehicle component.

BACKGROUND

Typically, a vehicle has an engine room for housing an internal combustion engine on a front-end part of the vehicle, and a heat exchanger such as a radiator is installed in the engine room. Such a heat exchanger is generally held through a holding structure disposed in the front-end part of a vehicle. For example, the holding structure holds the heat exchanger by locking four corners of the heat exchanger.

In order to protect the heat exchanger from fatal damage, the holding structure may be configured to detachably hold the heat exchanger. For example, when an impact force is applied to the heat exchanger due to a vehicle collision, the holding structure may unlock the heat exchanger and allow removal of the heat exchanger from the holding structure.

SUMMARY

According to an aspect of the present disclosure, a replaceable pin system for an in-vehicle component including: a holding member that is fixed to the in-vehicle component; and a pin member that is detachably connected to the holding member. The pin member includes a body, a protruding portion, and a first engaging portion, the body having two ends opposite to each other, the protruding portion protruding from the body in a protruding direction. The holding member includes a base, a retainer, and a second engaging portion. The retainer is spaced away from the base in the protruding direction to define a rotation space together with the base. The body is rotatable within the rotation space between a first orientation and a second orientation. The two ends are interposed between the retainer and the base when the body is rotated to the second orientation. The second engaging portion is formed in the holding member at a position where the first engaging portion is positioned when the body is rotated to the second orientation. The first engaging portion engages with the second engaging portion when the body is at the second orientation.

According to another aspect of the present disclosure, a replaceable pin system for an in-vehicle component including: a holding member that is fixed to the in-vehicle component; and a pin member that is detachably connected to the holding member. The pin member includes a body, a protruding portion, and a first engaging portion, the body having two ends opposite to each other, the protruding portion protruding from the body in a protruding direction. The holding member includes a base, a retainer, and a second engaging portion. The retainer is spaced away from the base in the protruding direction to define a slide space together with the base. The body is slidable within the slide space along a sliding direction. The two ends are interposed between the retainer and the base when the body is slid to the engaging position. The second engaging portion is formed in the holding member at a position where the first engaging portion is positioned when the body is slid to an engaging position. The first engaging portion engages with the second engaging portion when the body is at the engaging position.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
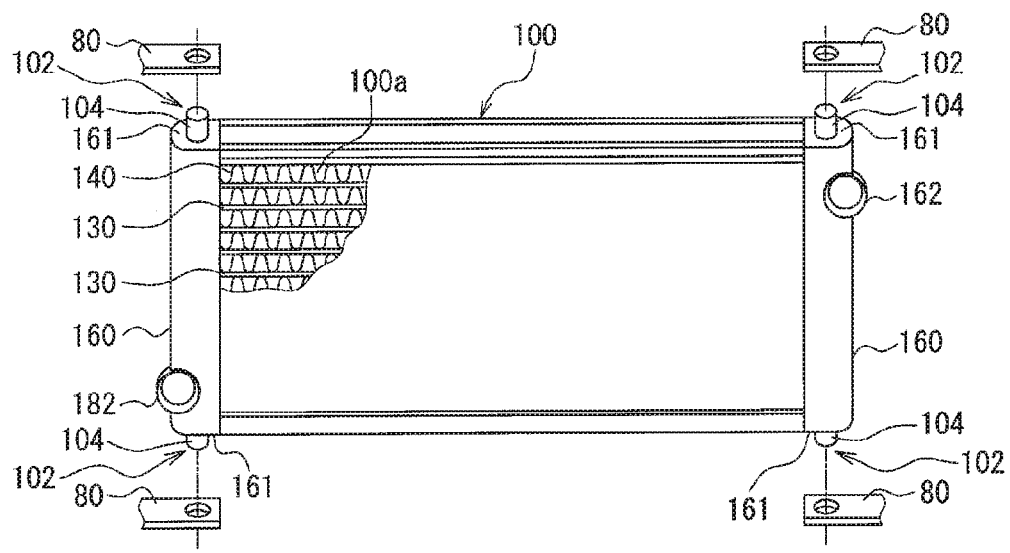
FIG. 1 is a perspective view showing a radiator.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

As follows, a first embodiment of the present disclosure will be described with reference to FIGS. 1 to 6. In the present embodiment, a radiator 100, as an in-vehicle component, is installed inside an engine room (not shown) defined by a frame of a vehicle. As shown in FIG. 1, the frame includes four brackets 80 by which four corners of the radiator 100 are held.

The radiator 100 includes a pair of tanks (tank bodies) 160, a plurality of tubes 130, and a plurality of fins 140. The fins 140 and the tubes 130 may be alternately arranged to form a core 100a of the radiator 100. The radiator 100 includes an inlet 162 and an outlet 182, and both the inlet 162 and the outlet 182 may be connected with an internal combustion engine through unillustrated pipes. The core 100a is interposed between the tanks 160.

As shown in FIG. 1, each of the tanks 160 has end surfaces 161 at both opposite side ends, and a replaceable pin systems 102 is disposed in the respective end surfaces 161. Therefore, the radiator 100 includes four replaceable pin systems 102 at the four corners of the radiator 100 in the present embodiment.

Here, one of the four replaceable pin systems 102 will be described as a representative with reference to FIGS. 2 to 6.

In the present disclosure, the replaceable pin system 102 employs a rotational-fitting type system where a pin member 104 is detachably connected to a holding member 106 by a rotational operation, as will be explained later.

The replaceable pin system 102 includes the holding member 106 and the pin member 104. The holding member 106 is fixed to the radiator 100, or more specifically, to one of the end surfaces 161 of the tank 160. The pin member 104 is detachably connected to the holding member 106. In a state where the holding member 106 is fixed to the tank 160 and the pin member 104 is connected to the holding member 106, the pin member 104 protrudes from the end surface 161 of the tank 160 (see FIG. 1).

Figure 2:
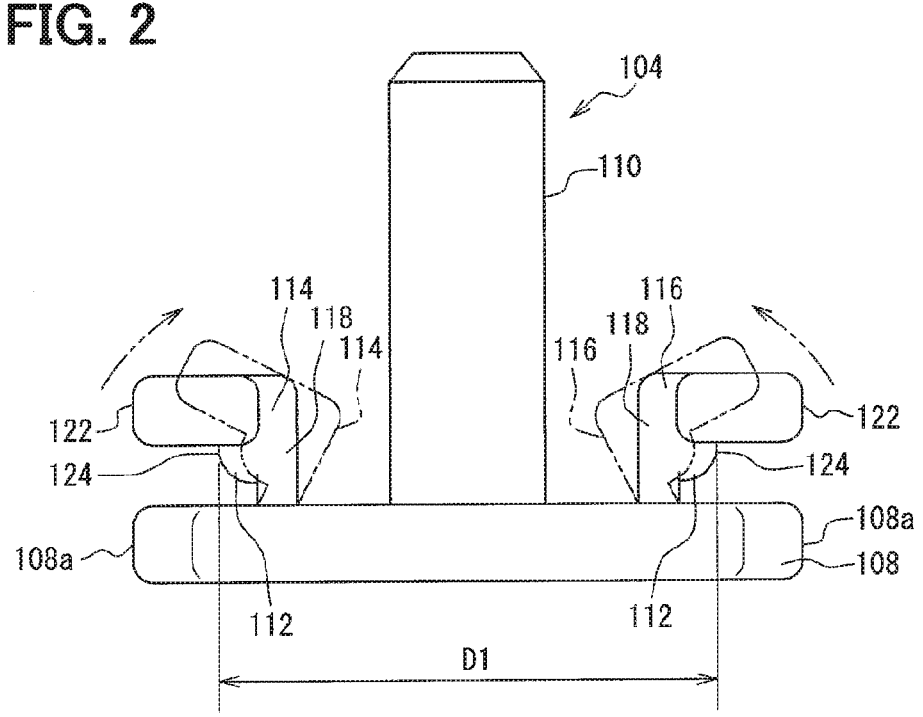
FIG. 2 is a side view showing a pin member.

As shown in FIG. 2, the pin member 104 includes a body 108, a protruding portion 110, and a first engaging portion 112. The body 108 is a plate-shaped member having two flat surfaces. Specifically, the body 108 has an elongated shape that extends in a direction (hereinafter, "elongated direction"). Furthermore, the body 108 has two ends 108a opposite to each other in the elongated direction. The two ends 108a have arc-shaped outlines that lie on a common circle C (see FIG. 3). That is, each of the two ends 108a extends along a portion of the common circle C. The body 108 also has two longitudinal sides that extend along the elongated direction. Both the two longitudinal sides are parallel to each other.

The protruding portion 110 is a columnar-shaped member that protrudes from the body 108 in a direction. Hereinafter, the direction along which the protruding portion 110 protrudes is referred to as "protruding direction", and a direction perpendicular to the protruding direction is referred to as "radial direction". In this embodiment, the protruding direction is substantially along the vertical direction in gravity, and the radial direction is parallel to a horizontal direction, although it may not be limited thereto. The protruding portion 110 is interposed between the two ends 108a of the body 108. More specifically, the protruding portion 110 is positioned at the center of the body 108, and thus is concentric with the common circle C of the body 108.

The pin member 104 further includes a first knob 114 and a second knob 116. The first and second knobs 114, 116 are disposed on the body 108. Each of the first and second knobs 114, 116 includes a root 118 and a grip 122. The root 118 extends from the body 108 in the protruding direction, and the grip 122 is disposed in the root 118 at the distal end thereof. The two grips 122 of the first and second knobs 114, 116 have arc-shaped outlines that lie on the common circle C of the body 108. In other words, the shape of the grip 122 is substantially the same as the corresponding end 108a of the body 108. The two grips 122 are spaced away from the body 108 in the protruding direction. The root 118 is formed of resin to be elastically flexible toward each other in the radial direction. Therefore, when a user pinches both the grips 122, the roots 118 are elastically curved toward each other.

In the present embodiment, the first engaging portion 112 includes two protrusions 124. One of the two protrusions 124 is disposed in the first knob 114 and the other of the two protrusions 124 is disposed in the second knob 116. More specifically, the protrusion 124 is formed at a corner between the root 118 and the grip 122, and the protrusion 124 outwardly protrudes from the root 118 in the radial direction. In other words, each of the two protrusions 124 protrudes in an opposite direction from each other. As shown in FIG. 2, a maximum distance between the two protrusions 124 is defined as a first distance D1.

The holding member 106 includes a base 126, a retainer 128, a second engaging portion 132. The base 126 has a setting surface 126a and two side portions 126b opposite to each other. The setting surface 126a is a flat surface on which the pin member 104 (the body 108) is set. The setting surface 126a is interposed between the two side portions 126b. Each of the two side portions 126b has a curved wall 134 that faces each other. Both the curved walls 134 have arc-shaped outlines that lie on the common circle C of the body 108 when the pin member 104 is connected to the holding member 106. In other words, when the pin member 104 is connected to the holding member 106, the two curved walls 134 are concentric with the common circle C defined by the ends 108a of the body 108.

Figure 5:
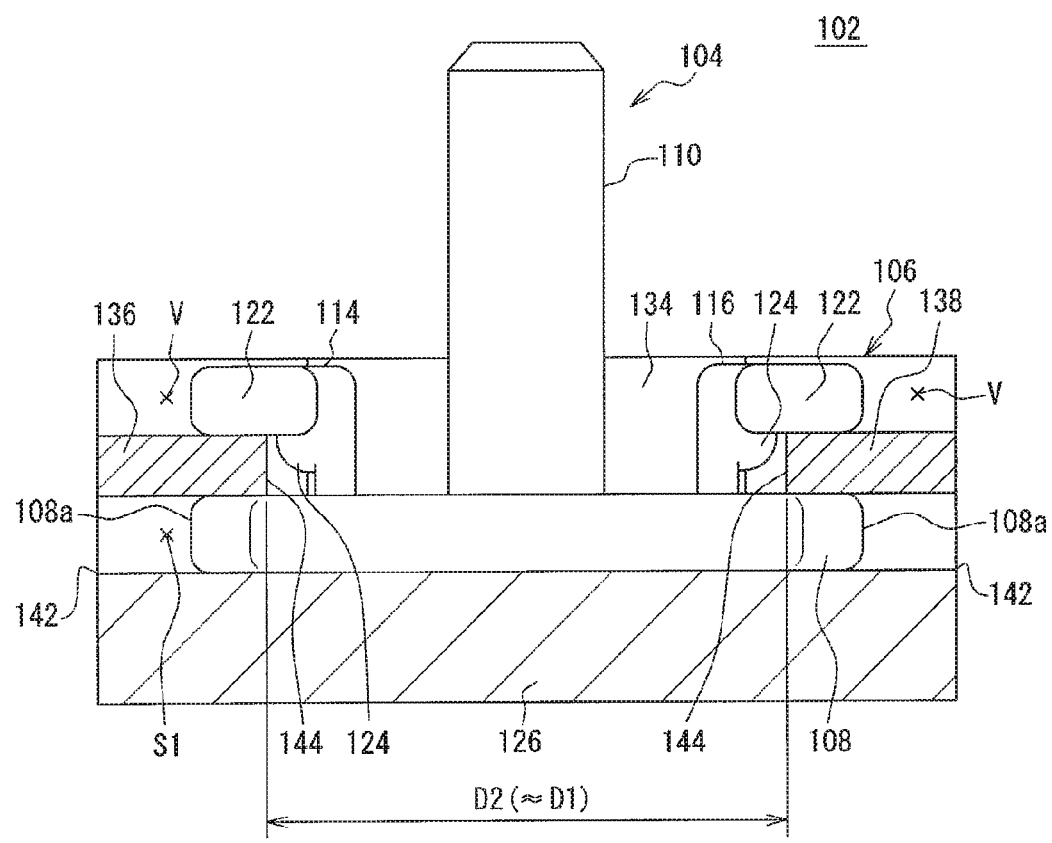
FIG. 5 is a cross-sectional view of the replaceable pin system.

The retainer 128 includes a first retaining portion 136 and a second retaining portion 138. The first and second retaining portions 136, 138 are opposite to each other in a direction perpendicular to a direction in which the two side portions 126b are opposite to each other. The distance between the first and second retaining portions 136, 138 is set to be less than the first distance D1 of the protrusions 124. Also, the distance between the first and second retaining portions 136, 138 is substantially the same as the distance between both the elongated sides of the body 108. As shown in FIG. 5, the first and second retaining portions 136, 138 are spaced away from the base 126 in the protruding direction to define a rotation space S1 together with the base 126. More specifically, the rotation space S1 is defined between the first and second retaining portions 136, 138 and the base 126 and between the two side portions 126b of the base 126.

As shown in FIG. 5, a distance between the first and second retaining portions 136, 138 and the base 126 is set to be substantially the same as a thickness of the body 108 in the protruding direction. A thickness of the first and second retaining portions 136, 138 in the protruding direction is also set to be substantially the same as the distance between the grips 122 and the body 108. Furthermore, the first and second retaining portions 136, 138 extend between both the side portions 126b of the base 126. Two spaces V are defined on the first and second retaining portions 136, 138 between the two side portions 126b.

Figure 6:
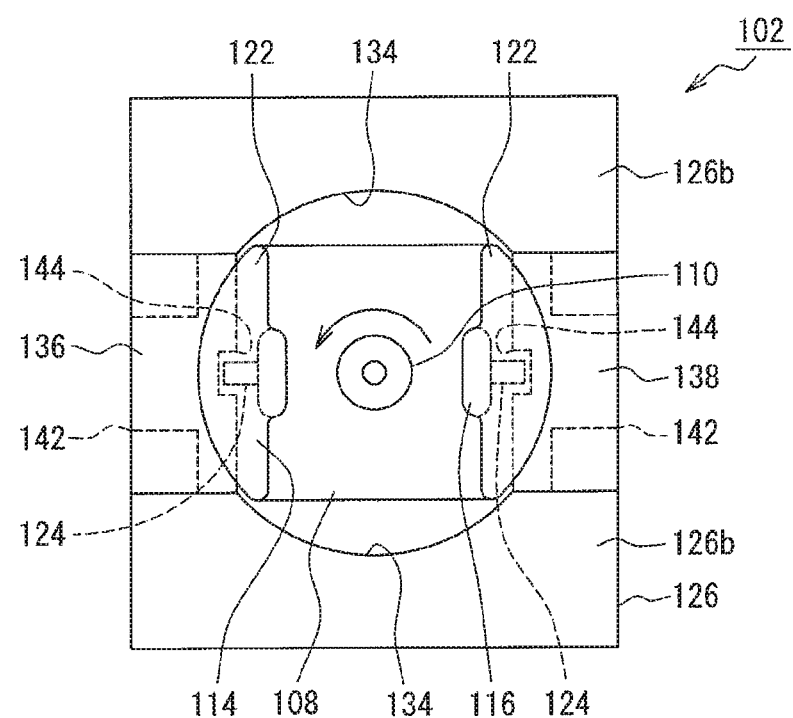
FIG. 6 is a plan view showing the replaceable pin system when the pin member is a second orientation.

Two openings 142 are formed on both sides of the base 126 that are opposite to each other in the direction in which the first and second retaining portions 136, 138 are opposite to each other. The opening 142 has a rectangular shape elongated along the direction in which both the side portions 126b of the base 126 are opposite to each other. The opening 142 is in communication with the rotation space S1. As shown in FIG. 6, the length of the opening 142 along the elongated direction of the opening is set to be less than the distance between both the longitudinal sides of the body 108.

The second engaging portion 132 includes two slots 144 that are opposite to each other. One of the two slots 144 is formed in the first retaining portion 136 and the other of the two slots 144 is formed in the second retaining portion 138. More specifically, the first and second retaining portions 136, 138 have inner surfaces that face each other, and one slot 144 is formed on the inner surface of the first retaining portion 136, and the other slot 144 is formed on the inner surface of the second retaining portion 138. The two slots 144 are recessed in a radially outward direction from the inner surfaces of the first and second retaining portions 136, 138. In other words, each of the two slots 144 is recessed from the inner surface in an opposite direction. As shown in FIG. 5, a maximum distance between the two slots 144 is defined as a second distance D2. In this embodiment, the first distance D1 of the two protrusions 124 is set to be substantially the same as the second distance D2 of the two slots 144.

Figure 3:
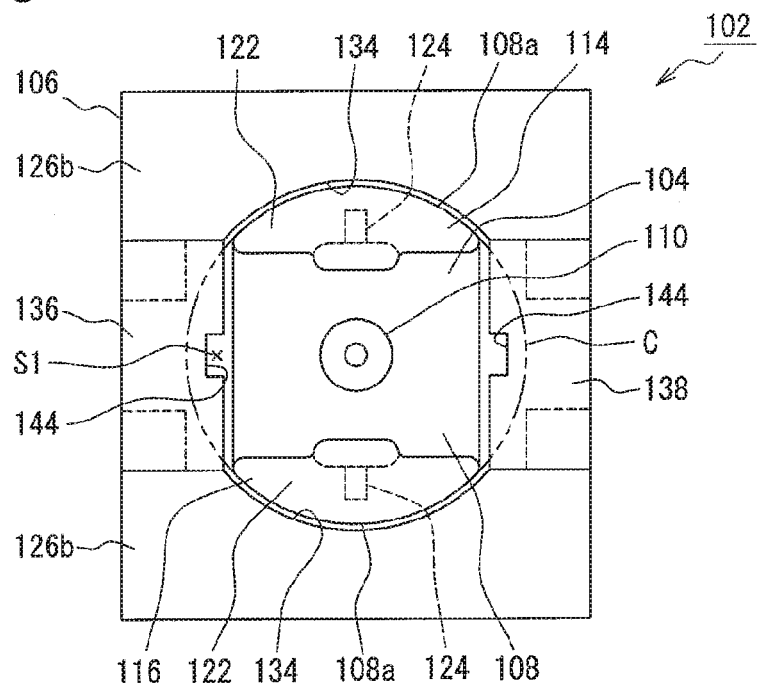
FIG. 3 is a plan view showing a replaceable pin system when the pin member is at a first orientation.
Figure 4:
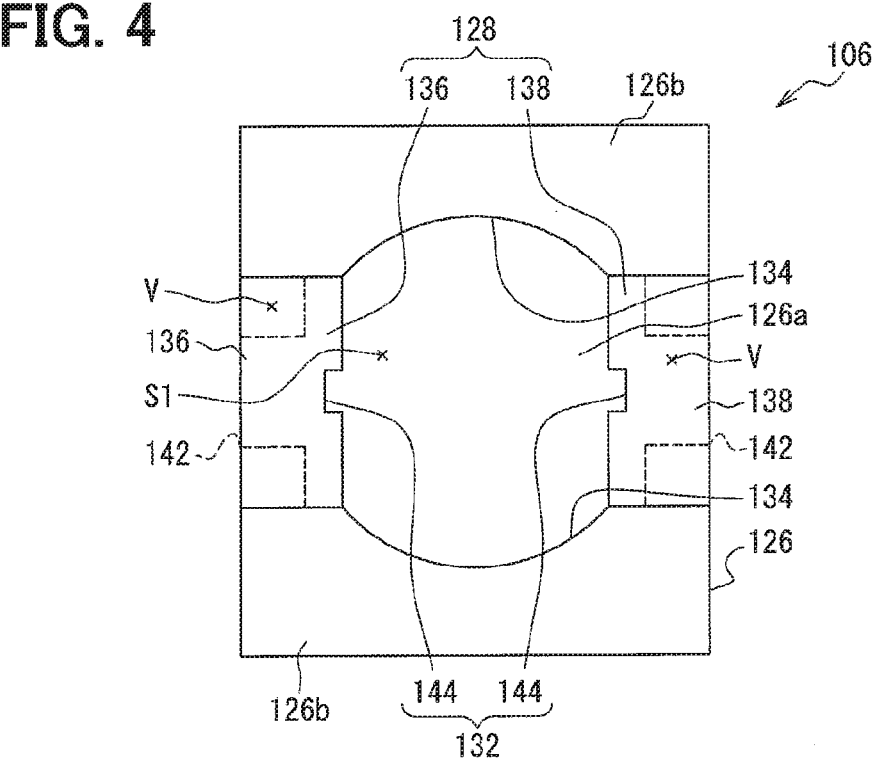
FIG. 4 is a plan view showing a holding member.

When a user connects the pin member 104 to the holding member 106, the body 108 is set in the rotation space S1 as shown in FIG. 3. The orientation of the body 108 that is set in the rotation space S1 is defined as a "first orientation". As described above, the two curved walls 134 lie on the common circle C defined by the two ends 108a of the body 108, and therefore, the body 108 is fit inside the rotation space S1.

Next, the user inwardly pinches the first and second knobs 114, 116 while rotating the body 108 about the protruding portion 110. In this case, both the grips 122 are guided by the curved walls 134 of the base 126, and thus the body 108 can be smoothly rotated. When the body 108 is rotated by about 90°, the body 108 is position at an orientation (hereinafter "second orientation") where the two protrusions 124 are aligned with the corresponding slots 144. In this case, since the first and second knobs 114, 116 are inwardly pinched by the user, the protrusions 124 do not interfere with the first and second retaining portions 136, 138 during rotation even though the first distance D1 is greater than the distance between the first and second retaining portions 136, 138.

When the body 108 is rotated to the second orientation, the user releases the pinching of the first and second knobs 114, 116. Then, the first and second knobs 114, 116 (the roots 118) elastically return to an original state, and the protrusions 124 are fit into the slots 144. In other words, the second engaging portion 132 is formed in the holding member 106 at a position where the first engaging portion 112 is positioned when the body 108 is rotated to the second orientation. Accordingly, the first engaging portion 112 engages with the second engaging portion 132, whereby the body 108 is prohibited from rotating and is held at the second orientation. Furthermore, when the body 108 is rotated to the second orientation, the two ends 108a are interposed between the retainer 128 and the base 126, as shown in FIG. 5. More specifically, one end 108a of the body 108 is interposed between the first retaining portion 136 and the base 126, and the other end 108a of the body 108 is interposed between the second retaining portion 138 and the base 126. As a result, the body 108 is prohibited from separating from the holding member 106 in the protruding direction by the interference of the retainer 128.

In addition, when the body 108 is rotated to the second orientation, the grips 122 are positioned in the spaces V on the first and second retaining portions 136, 138. Thus, the first retaining portion 136 is interposed between the body 108 and the grip 122 of the first knob 114, and the second retaining portion 138 is interposed between the body 108 and the grip 122 of the second knob 116. Therefore, the retainer 128 is cramped between the first and second knobs 114, 116 and the body 108, whereby the pin member 104 can be stably held at the second orientation. It should be noted that since the lengths of the openings 142 on the sides of the base 126 are set to be less than the distance between both the longitudinal sides of the body 108, the body 108 is prohibited from separating from the base 126 through the openings 142 (see FIG. 6).

In this way, the pin member 104 is easily connected to the holding member 106 by pinching and rotating without a particular tool. Therefore, a user can effectively connect the pin member 104 to the holding member 106. After connecting the pin member 104 to the holding member 106, the protruding portion 110 is inserted into a hole of the bracket 80 and then is fixed to the bracket 80. In this way, the four corners of the radiator 100 are fixed to the brackets 80 and the radiator 100 is installed in the engine room.

When a user removes the pin member 104 from the holding member 106, a user inwardly pinches the first and second knobs 114, 116 to release the engagement between the first and second engaging portions 132. Next, the user rotates the body 108 about the protruding portion 110 from the second orientation toward the first orientation. When the body 108 is rotated to the first orientation as shown in FIG. 3, the two ends 108a of the body 108 are away from the spaces between the first and second retaining portions 136, 138 and the base 126. Then, the user releases the pinching of the first and second knobs 114, 116, and removes the pin member 104 from the holding member 106 in the protruding direction.

In this way, the pin member 104 can be readily removed from the holding member 106. Thus, the replacing process of the pin member 104 can be effectively performed just by pinching and rotating actions. When the body 108 is at the second orientation, the two grips 122 are in the spaces V on the first and second retaining portions 136, 138. Therefore, because the two grips 122 are exposed to an outside of the holding member 106, a user can easily access and manipulate the grips 122.

Modifications to the First Embodiment

In the first embodiment, the first and second knobs 114, 116 are disposed to be opposite to each other in the elongated direction of the body 108. However, the first and second knobs 114, 116 may be disposed in the body 108 to be opposite to a direction perpendicular to the elongated direction. In this case, the slots 144 may be formed on the curved walls 134.

In the first embodiment, the two knobs 114, 116 are used, but one knob or 3 or more knobs may be used.

Figure 7:
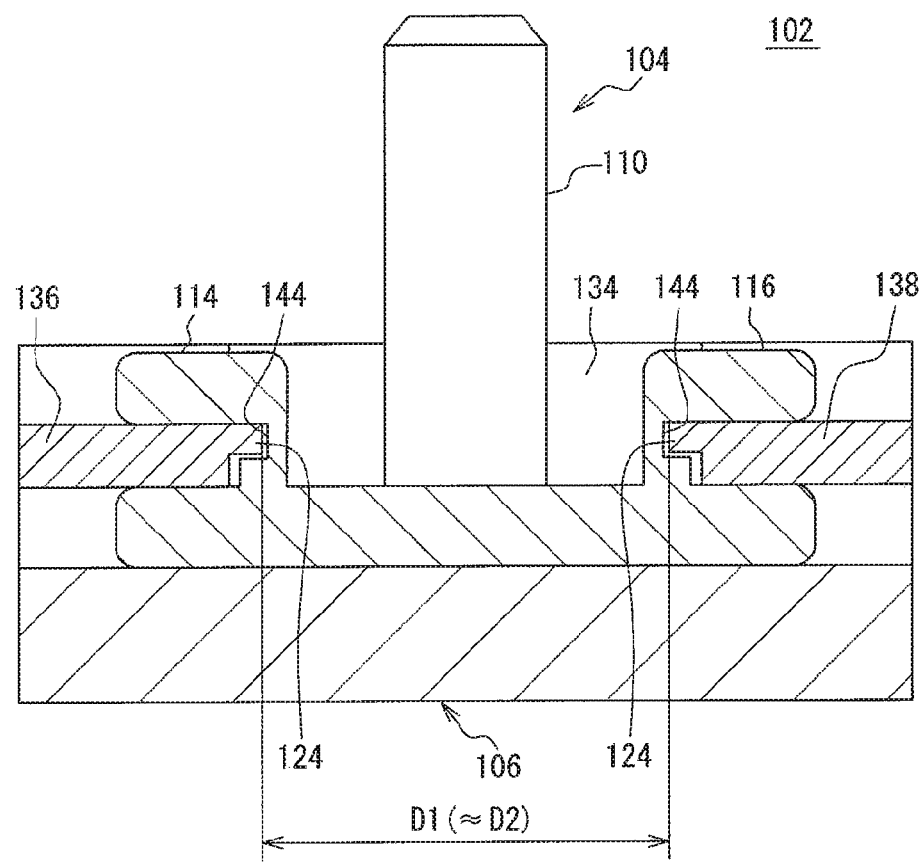
FIG. 7 is a cross-sectional view of a replaceable pin system according to another embodiment.

In the first embodiment, the protrusions 124 are formed in the first and second knobs 114, 116, and the slots 144 are formed in the first and second retaining portions 136, 138. However, as shown in FIG. 7, the protrusions 124 may be formed in the first and second retaining portions 136, 138 and the slots 144 may be formed in the first and second knobs 114, 116. In this case, the protrusions 124 may protrude in a radially inward direction from the inner surfaces of the first and second retaining portions 136, 138, and the slots 144 are inwardly recessed from outer surfaces of the first and second knobs 114, 116. Furthermore, in this modification, the first distance D1 is defined between the slots 144, and the second distance D2 is defined between the protrusions 124. The first distance D1 of the slots 144 may be equal to or greater than the second distance D2 of the protrusions 124.

In the first embodiment, the first distance D1 is substantially the same as the second distance D2. However, the first distance D1 of the protrusions 124 when the protrusions 124 do not engage with the slots 144 may be greater than the second distance D2 of the slots 144. In this case, the protrusions 124 engage with the slots 144 in a state where the first and second knobs 114, 116 are inwardly curved, which contributes to stronger engaging between the protrusions 124 and the slots 144.

Second Embodiment

Figure 8:
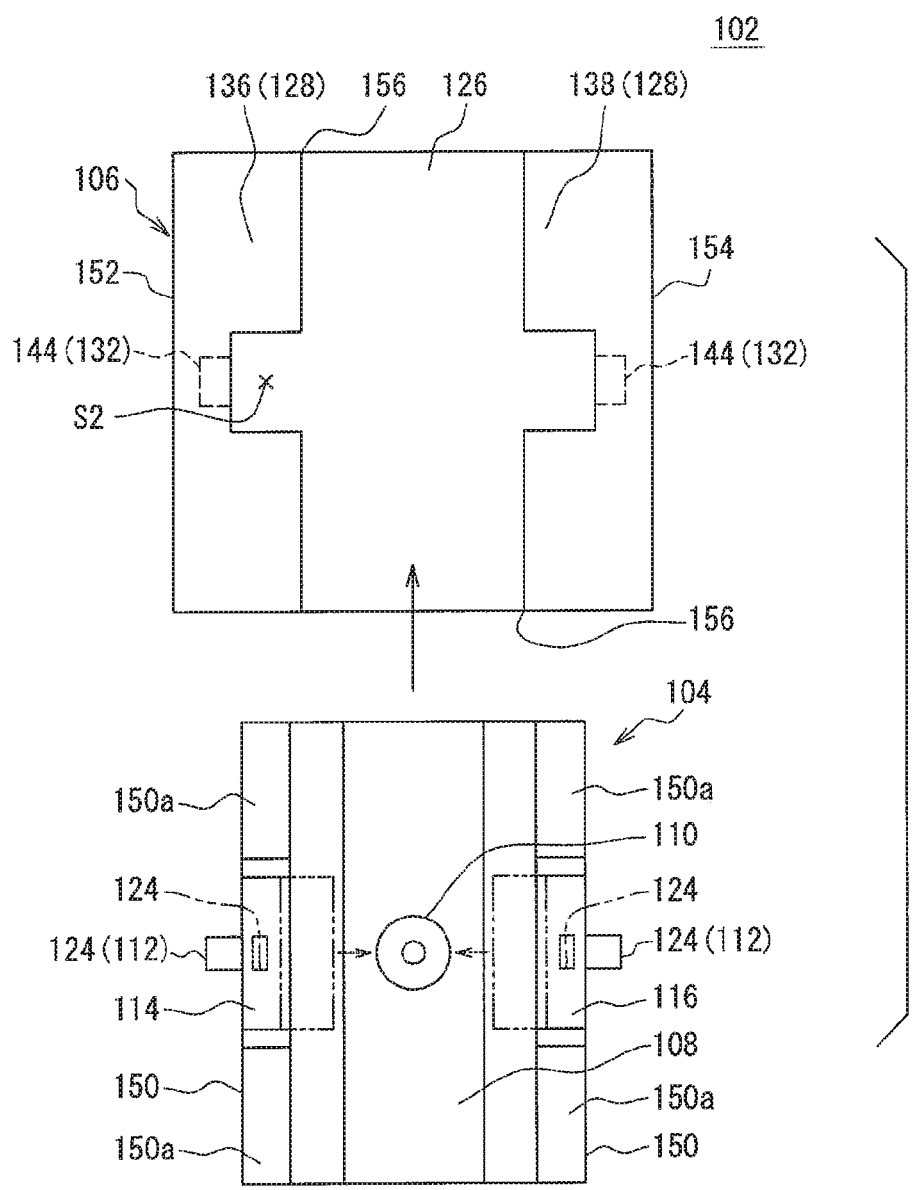
FIG. 8 is a plan view of a replaceable pin system when a pin member is separated from a holding structure.
Figure 9:
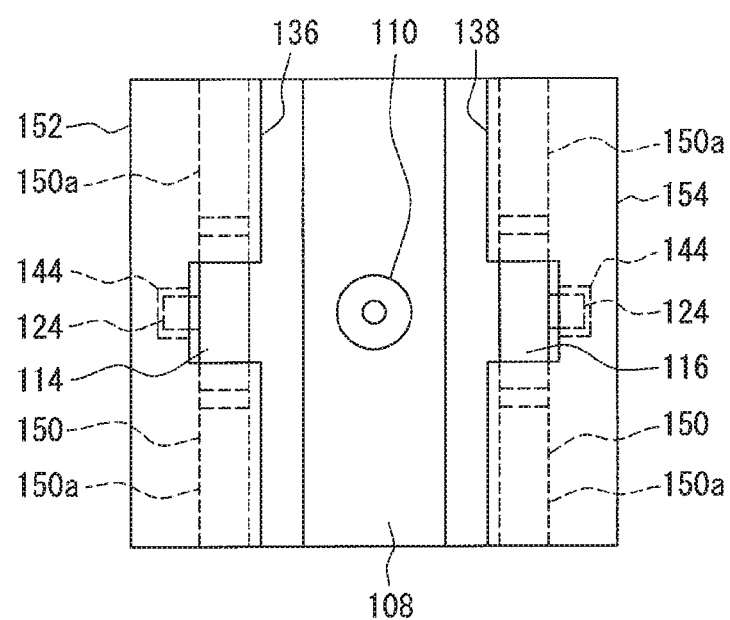
FIG. 9 is a plan view of the replaceable pin system when the pin member is at an engaging position.
Figure 10:
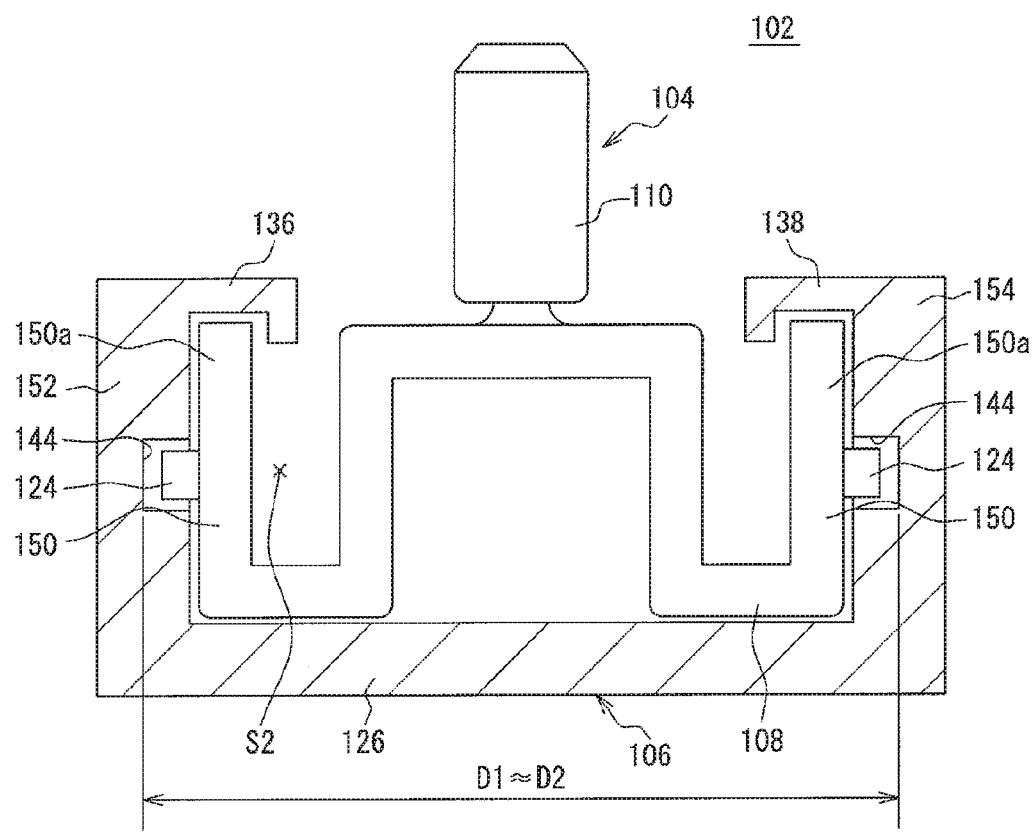
FIG. 10 is a cross-sectional view of the replaceable pin system.

A second embodiment of the present disclosure will be described with reference to FIGS. 8 to 10. In the second embodiment, the replaceable pin system 102 employs a slide-fitting type system where the pin member 104 is detachably connected to the holding member 106 by sliding operation.

The body 108 of the pin member 104 in the present embodiment has a rectangular shape and includes guide walls 150 that are opposite to each other. Both the guide walls 150 extend along a sliding direction of the body 108, and are parallel to each other. Each guide wall 150 is divided into three wall portions by two slits. In the present embodiment, the middle wall portions of the two guide walls 150 serve as the first knob 114 and the second knob 116. Hereinafter, the wall portions adjacent to the middle portion are referred to as "side wall portions 150*a*", which may serve as "ends" of the body 108.

The protrusion 124 is formed on the first knob 114 to outwardly protrude from the first knob 114. Similarly, the protrusion 124 is formed on the second knob 116 to outwardly protrude from the second knob 116. In other words, each of the two protrusions 124 protrudes in an opposite direction from each other. The protruding portion 110 extends from the body 108 in the protruding direction. The protruding portion 110 is interposed between the first and second knobs 114, 116.

In the present embodiment, the holding member 106 includes a first wall 152 and a second wall 154. Each of the first and second walls 152, 154 protrudes from the base 126 in the protruding direction and extends along a respective side of the base 126. Therefore, the first and second walls 152, 154 are parallel to each other. A distance between the first and second walls 152, 154 is substantially the same as a distance between the two guide walls 150 of the pin member 104. The holding member 106 has two side openings 156 at both ends that are open toward the sliding direction.

The first retaining portion 136 is formed in the first wall 152 at the distal end of the first wall 152. More specifically, the first retaining portion 136 is formed in the distal end of the first wall 152 except a middle region of the distal end. Therefore, the first retaining portion 136 is divided into two parts as shown in FIG. 8. The first retaining portion 136 extends from the first wall 152 toward the second wall 154. Similarly, the second retaining portion 138 is formed in the distal end of the second wall 154 except a middle region of the distal end. Thus, the second retaining portion 138 is divided into two parts. The second retaining portion 138 extends from the second wall 154 toward the first wall 152. Therefore, a slide space S2 is defined between the first and second retaining portions 136, 138 and the base 126 as shown in FIG. 10.

One of the two slots 144 is formed in the first wall 152 at a middle position of the first wall 152 in the sliding direction, and the other of the two slots 144 is formed in the second wall 154 at a middle position of the second wall 154 in the sliding direction. More specifically, the first wall 152 and second wall 154 have inner surfaces facing each other, and the two slots 144 are formed on the inner surfaces of the first and second walls 152, 154. Each of the two slots 144 is recessed in a radially outward direction from the inner surface, in other words, each of the two slots 144 is recessed in an opposite direction. The first distance D1 between the protrusions 124 is substantially the same as the second distance D2 between the slots 144.

When a user connects the pin member 104 to the holding member 106, the user inserts the pin member 104 into the slide space S2 of the holding member 106 through one side opening 156. Next, the user inwardly pinches the first and second knobs 114, 116 and further inserts the pin member 104 into the slide space S2 so that the pin member 104 slides inside the slide space S2 along the sliding direction. In this case, the guide walls 150 are in contact with the inner surfaces of the first and second walls 152, 154, whereby the insertion of the pin member 104 into the slide space S2 can be effectively performed. Further, the first and second knobs 114, 116 are elastically curved by the user, the protrusions 124 do not interfere with the first and second walls 152, 154.

When the pin member 104 is slid to a position (engaging position) where the protrusions 124 are aligned with the slots 144, the user releases the pinching of the first and second knobs 114, 116. Then, the first and second knobs 114, 116 elastically return to the original state and the protrusions 124 engage with the slots 144. That is, the pin member 104 is connected to the holding member 106. In this way, the pin member 104 can be easily connected to the holding member 106 by pinching and sliding actions.

When the body 108 is at the engaging position, both the side wall portions 150*a* are interposed between the retainer 128 (the first and second retaining portions 136, 138) and the base 126. Accordingly, the pin member 104 is prohibited from separating from the holding member 106 in the protruding direction. On the contrary, the first and second knobs 114, 116 are offset from the first and second retaining portions 136, 138, respectively (see FIG. 9). Therefore, the first and second knobs 114, 116 are exposed to an outside of the holding member 106, and thus a user can access the first and second knobs 114, 116.

When the pin member 104 is removed from the holding member 106, a user pinches the first and second knobs 114, 116 to release the engaging between the protrusions 124 and the slots 144. Then, the user slides the body 108 in the sliding direction and removes the pin member 104 through one side opening 156. Accordingly, the pin member 104 can be readily removed from the holding member 106 by pinching and sliding actions.

Modifications to the Second Embodiment

Figure 11:
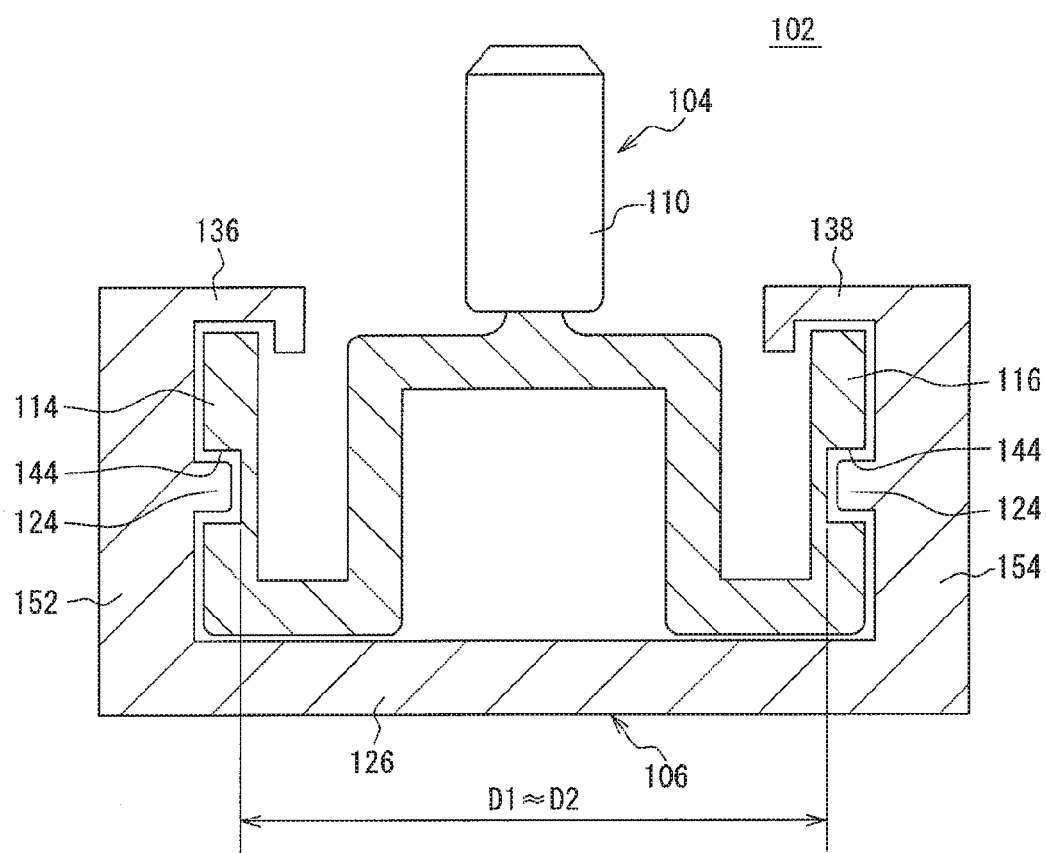
FIG. 11 is a cross-sectional view of a replaceable pin system according to another embodiment.

In the second embodiment, the protrusions 124 are formed in the first and second knobs 114, 116, and the slots 144 are formed in the first and second walls 152, 154. However, as shown in FIG. 11, the protrusions 124 may be formed in the first and second walls 152, 154 and the slots 144 may be formed in the first and second knobs 114, 116. In this case, the protrusions 124 may protrude in a radially inward direction from the inner surfaces of the first and second walls 152, 154, and the slots 144 are inwardly recessed from outer surfaces of the first and second knobs 114, 116. Furthermore, in this modification, the first distance D1 is defined between the slots 144, and the second distance D2 is defined between the protrusions 124. The first distance D1 of the slots 144 may be equal to or greater than the second distance D2 of the protrusions 124.

In the second embodiment, the first distance D1 is substantially the same as the second distance D2. However, the first distance D1 of the protrusions 124 when the protrusions 124 do not engage with the slots 144 may be greater than the second distance D2 of the slots 144. In this case, the protrusions 124 engage with the slots 144 in a state where the first and second knobs 114, 116 being inwardly curved, which contributes to stronger engaging between the protrusions 124 and the slots 144.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. As used herein, the term "and/or" includes any and all combinations of one or more of the associated listed items.

What is claimed is:

1. A replaceable pin system for an in-vehicle component, the replaceable pin system comprising:
   a holding member that is fixed to the in-vehicle component; and
   a pin member that is detachably connected to the holding member, wherein
   the pin member includes a body, a protruding portion, and a first engaging portion, the body having two ends opposite to each other, the protruding portion protruding from the body in a protruding direction,
   the holding member includes a base, a retainer, and a second engaging portion,
   the retainer is spaced away from the base in the protruding direction to define a rotation space together with the base, the body being rotatable within the rotation space between a first orientation and a second orientation,
   the two ends are interposed between the retainer and the base when the body is rotated to the second orientation, and
   the second engaging portion is formed in the holding member at a position where the first engaging portion is positioned when the body is rotated to the second orientation, whereby the first engaging portion engages with the second engaging portion when the body is at the second orientation.

2. The replaceable pin system according to claim 1, wherein
   the pin member further includes a first knob and a second knob that are disposed on the body to protrude from the body in the protruding direction, the first and second knobs interposing the protruding portion therebetween,
   the first engaging portion includes two protrusions, one of the two protrusions outwardly protruding from the first knob in a radial direction of the protruding portion, the other of the two protrusions outwardly protruding from the second knob in the radial direction,
   the second engaging portion includes two slots that are formed in the holding member to be opposite to each other,
   a first distance is defined between the two protrusions,
   a second distance is defined between the two slots,
   the first distance is equal to or greater than the second distance, and
   the first knob and the second knob are configured to be inwardly flexible in the radial direction.

3. The replaceable pin system according to claim 2, wherein
   the retainer includes a first retaining portion and a second retaining portion, the first and second retaining portions being opposite to each other,
   one of the two slots is formed in the first retaining portion and the other of the two slots is formed in the second retaining portion.

4. The replaceable pin system according to claim 2, wherein
   the first knob and the second knob are formed of resin to be elastically flexible.

5. The replaceable pin system according to claim 1, wherein
   the pin member further includes a first knob and a second knob that are disposed on the body to protrude from the body in the protruding direction, the first and second knobs interposing the protruding portion therebetween,
   the first engaging portion includes two slots, one of the two slots being inwardly recessed from the first knob in a radial direction of the protruding portion, the other of the two slots being inwardly recessed from the second knob in the radial direction,
   the second engaging portion includes two protrusions that are formed in the holding member to be opposite to each other,
   a first distance is defined between the two slots,
   a second distance is defined between the two protrusions,
   the first distance is equal to or greater than the second distance, and
   the first knob and the second knob are configured to be inwardly flexible in the radial direction.

6. The replaceable pin system according to claim 5, wherein
   the retainer includes a first retaining portion and a second retaining portion, the first and second retaining portions being opposite to each other, and
   one of the two protrusions is formed in the first retaining portion and the other of the two protrusions is formed in the second retaining portion.

7. The replaceable pin system according to claim 1, wherein
   the two ends of the body have arc-shaped outlines that lie on a common circle,
   the base includes two curved walls that are opposite to each other, and
   the two curved walls have arc-shaped outlines that lie on the common circle when the pin member is connected to the holding member.

8. A replaceable pin system for an in-vehicle component, the replaceable pin system comprising:
- a holding member that is fixed to the in-vehicle component; and
- a pin member that is detachably connected to the holding member, wherein
- the pin member includes a body, a protruding portion, and a first engaging portion, the body having two ends opposite to each other, the protruding portion protruding from the body in a protruding direction,
- the holding member includes a base, a retainer, and a second engaging portion,
- the retainer is spaced away from the base in the protruding direction to define a slide space together with the base, the body being slidable within the slide space along a sliding direction,
- the two ends are interposed between the retainer and the base when the body is slid to an engaging position, and
- the second engaging portion is formed in the holding member at a position where the first engaging portion is positioned when the body is slid to the engaging position, whereby the first engaging portion engages with the second engaging portion when the body is at the engaging position.

9. The replaceable pin system according to claim 8, wherein
- the pin member further includes a first knob and a second knob that are disposed on the body to protrude from the body in the protruding direction, the first and the second knobs interposing the protruding portion therebetween,
- the first engaging portion includes two protrusions, one of the two protrusions outwardly protruding from the first knob in a radial direction of the protruding portion, the other of the two protrusions outwardly protruding from the second knob in the radial direction,
- the second engaging portion includes two slots that are formed in the holding member to be opposite to each other,
- a first distance is defined between the two protrusions,
- a second distance is defined between the two slots,
- the first distance is equal to or greater than the second distance, and
- the first knob and the second knob are configured to be inwardly flexible in the radial direction.

10. The replaceable pin system according to claim 9, wherein
- the first knob and the second knob are formed of resin to be elastically flexible.

11. The replaceable pin system according to claim 9, wherein
- the holding member includes a first wall and a second wall that protrude from the base in the protruding direction, the first and second walls being opposite to each other,
- the retainer includes a first retaining portion and a second retaining portion,
- the first retaining portion is formed on a distal end of the first wall to protrude toward the second wall,
- the second retaining portion is formed on a distal end of the second wall to protrude toward the first wall,
- one of the two slots is formed in the first wall and the other of the two slots is formed in the second wall, and
- the first knob and the second knob are offset from the first retaining portion and the second retaining portion, respectively, in the sliding direction of the body when the body is in the engaging position.

12. The replaceable pin system according to claim 8, wherein
- the pin member further includes a first knob and a second knob that are disposed on the body to protrude from the body in the protruding direction, the first and second knobs interposing the protruding portion therebetween,
- the first engaging portion includes two slots, one of the two slots being inwardly recessed from the first knob in a radial direction of the protruding portion, the other of the two slots being inwardly recessed from the second knob in the radial direction,
- the second engaging portion includes two protrusions that are formed in the holding member to be opposite to each other,
- a first distance is defined between the two slots,
- a second distance is defined between the two protrusions,
- the first distance is equal to or greater than the second distance, and
- the first knob and the second knob are configured to be inwardly flexible in the radial direction.

13. The replaceable pin system according to claim 12, wherein
- the first knob and the second knob are formed of resin to be elastically flexible.

14. The replaceable pin system according to claim 12, wherein
- the holding member includes a first wall and a second wall that protrude from the base in the protruding direction, the first and second walls being opposite to each other,
- the retainer includes a first retaining portion and a second retaining portion,
- the first retaining portion is formed on a distal end of the first wall to protrude toward the second wall,
- the second retaining portion is formed on a distal end of the second wall to protrude toward the first wall,
- one of the two protrusions is formed in the first wall and the other of the two protrusions is formed in the second wall, and
- the first knob and the second knob are offset from the first retaining portion and the second retaining portion, respectively, in the sliding direction of the body when the body is at the engaging position.

15. The replaceable pin system according to claim 1, wherein
- the in-vehicle component is a radiator.

16. The replaceable pin system according to claim 15, wherein
- the radiator includes a tank, and
- the holding member is fixed to the tank.

\* \* \* \* \*